United States Patent Office 3,770,846
Patented Nov. 6, 1973

3,770,846
NOVEL COMPOSITIONS
Fred A. Stuber, North Haven, and Henri Ulrich, North Branford, Conn., assignors to The Upjohn Company, Kalamazoo, Mich.
No Drawing. Filed Sept. 13, 1971, Ser. No. 180,203
Int. Cl. C08f 27/06, 27/08, 29/48
U.S. Cl. 260—823    7 Claims

ABSTRACT OF THE DISCLOSURE

Stilbenes of the formula:

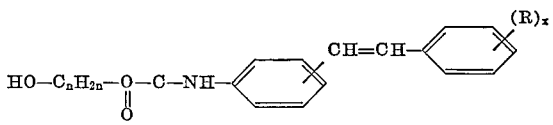

where $C_nH_{2n}$ is alkylene, R is alkoxy, and $x$ is 1 to 3, and radiation sensitive polymers derived therefrom, are described. The radiation sensitive polymers include (i) those which are characterized by a recurring unit represented by the formula:

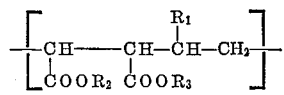

wherein $R_1$ is lower-alkoxy or phenyl, one of $R_2$ and $R_3$ is hydrogen and the other is:

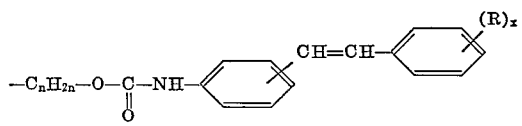

where $C_nH_{2n}$ and $(R)_x$ are as above, and (ii) those which are characterized by a combination of two recurring units in the same molecule one of the units being that present in the polymers (i) and the other unit having the same general formula above wherein $R_1$ is as above defined, one of $R_2$ and $R_3$ is hydrogen and the other is:

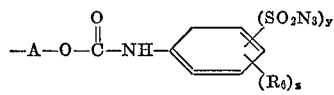

where A is alkylene as defined above, $R_6$ is lower alkyl or halogen, $x$ is 1 or 2, $y$ is 0 to 2 and $x+y$ is 1 to 3. Water soluble salts of the above polymers are also disclosed. The stilbene moiety in said polymers acts as a built-in sensitizer for the radiation sensitization of the sulfonazido moiety. The radiation-sensitive polymers are useful in a variety of ways including modification of the surface of —C—H containing polymers, bonding basic dyestuffs to non-dye receptive substrates, photoimaging and the like.

BACKGROUND OF THE INVENTION

(1) Field of the invention

This invention relates to novel stilbene derivatives and to radiation-sensitive polymers derived therefrom and is more particularly concerned with hydroxyalkyl esters of alkoxy stilbene carbamic acids and with radiation-sensitive polymers having a combination of free carboxy groups, alkoxy stilbene carbamoyloxy groups, and/or azidosulfonylcarbanilyl alkoxycarbonyl groups dependant from the chain thereof and with processes for their preparation and use.

(2) Description of the prior art

Radiation-sensitive polymers have recently been developed which are characterized by the recurring unit:

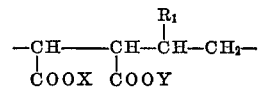

wherein $R_1$ represent lower-alkoxy or phenyl, one of X and Y represents hydrogen and the other of X and Y represents an azidosulfonylcarbanilyl alkoxycarbonyl group. Such polymers are described in detail in the copending application Ser. No. 93,446, filed Nov. 27, 1970, filed in the names of Adnan A. R. Sayigh, Fred A. Stuber, and Henri Ulrich. These polymers are useful in the production of continuous tone images, in rendering hydrophilic the surface of substrates containing C—H bonds, in rendering such substrates receptive to chemical bonding with basic dyestuffs, and in a variety of other ways.

We have now found that these polymers can be sensitized, and thereby endowed with enhanced usefulness, by the incorporation therein of moieties derived from certain novel stilbene compounds.

SUMMARY OF THE INVENTION

The present invention comprises stilbenes of the formula:

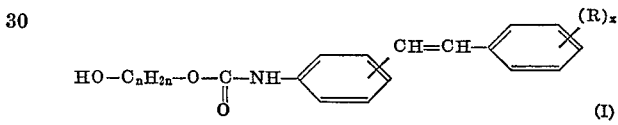

wherein R represents lower-alkoxy, $x$ is an integer from 1 to 3 and $C_nH_{2n}$ represents alkylene having from 2 to 6 carbon atoms separating the valencies and a total carbon atom content of from 2 to 10.

The invention also comprises radiation-sensitive polymers selected from the class consisting of:

(a) polymers characterized by the presence of the recurring unit represented by the formula:

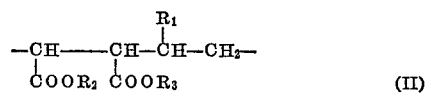

wherein $R_1$ is selected from the class consisting of lower-alkoxy and phenyl, one of $R_2$ and $R_3$ represents hydrogen and the other represents a moiety of the formula:

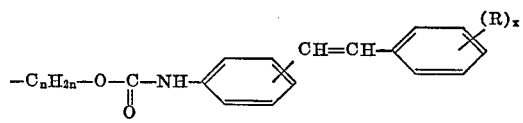

wherein R, $n$ and $C_nH_{2n}$ have the significance above defined;

(b) polymers characterized by the presence, in combination in the same molecule, of each of two recurring units, one of which has the formula (II) above, wherein in $R_1$, $R_2$, and $R_3$ are as defined above, and the other of which has the formula:

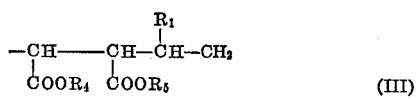

wherein $R_1$ is as above defined, one of $R_4$ and $R_5$ represents hydrogen and the other represents a group of the formula:

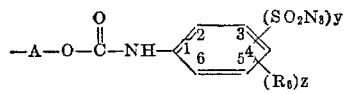

wherein A is alkylene having from 2 to 6 carbon atoms separating the valencies and a total carbon atom content of from 2 to 10, $R_6$ is selected from the class consisting of lower-alkyl and halogen, y is an integer from 1 to 2, z is an integer from 0 to 2, provided that y+z is not greater than 3, and the $SO_2N_3$ group is in any of positions 3, 4, and 5 in the phenyl nucleus to which it is attached, and at least one of the said positions 3, 4, and 5 is unsubstituted; and (c) the salts of the above polymers (a) and (b) with a salt-forming moiety selected from the class consisting of alkali metals, alkaline earth metals, ammonia and tertiary amines.

It is to be noted that the stilbene (I) and the radiation-sensitive polymers derived therefrom can exist in both cis and trans forms. It is to be understood that both the cis and trans isomers of all the novel compounds and polymers disclosed herein, as well as mixtures of such isomers, are included within the scope of this invention.

The term "alkylene having from 2 to 6 carbon atoms separating the valencies and a total carbon atom content from 2 to 10" means a divalent aliphatic hydrocarbon radical having the stated carbon atom content in the chain separating the valencies and overall. Illustrative of such radicals are ethylene, 1,2-propylene, 1,3-propylene, 1,4-butylene, 1,2-pentylene, 1,3-hexylene, 2,2-dimethyl-1,3-propylene, 2-methyl-1,4-butylene, 3-methyl-1,2-pentylene, 2-ethyl-1,2-octylene and the like.

The term "lower-alkyl" means alkyl from 1 to 6 carbon atoms, inclusive, such as methyl, ethyl, propyl, butyl, pentyl, hexyl, and isomeric forms thereof. The term "lower-alkoxy" means alkoxy from 1 to 6 carbon atoms, inclusive, such as methoxy, ethoxy, propoxy, butoxy, pentyloxy, hexyloxy, and isomeric forms thereof. The term "halogen" is employed in its usual accepted sense as being inclusive of fluorine, chlorine, bromine, and iodine.

The term "radiation-sensitive" is used herein to indicate that the polymers of the invention can be activated and undergo molecular modification on exposure to thermal and/or actinic radiation.

The novel polymers of the invention are useful in a variety of ways. Illustratively they can be employed to bond chemically basic dyestuffs to polymeric and other substrates, they can be used to produce continuous tone, non-silver containing images, they can be used to convert normally hydrophobic polymer materials to hydrophilic materials and they can be used in the preparation of photoresist systems.

DETAILED DESCRIPTION OF THE INVENTION

The novel stilbenes of the Formula I are conveniently prepared by reaction of the appropriate diol of the formula:

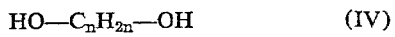

wherein $C_nH_{2n}$ has the significance hereinbefore defined, with the appropriate isocyanatostilbene of the formula:

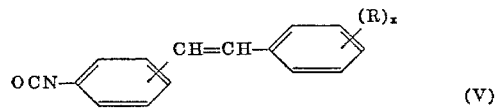

wherein R and x have the significance hereinbefore defined. The reaction is carried out under conditions well known in the art for the reaction of alcohols and isocyanates. Advantageously, the reactants are brought together at ambient temperatures, i.e. of the order of 20 to 25° C., in the presence of an inert organic solvent, i.e. an organic solvent which does not enter into the reaction with either of the reactants or interfere in any other way with the desired course of the reaction. Examples of inert organic solvents are acetonitrile, tetrahydrofuran, dioxane, and the like. If desired, the reaction between the diol (IV) and the isocyanate (V) can be carried out in the presence of a catalyst for the reaction of isocyanates with active hydrogen containing compounds. Illustrative of such catalysts are tertiary amines, for example, triethylene diamine, triethylamine, N,N,N',N'-tetramethylethylene diamine, N-methylmorpholine, 1,1,3,3-tetramethylguanidine and the like, and organometallic compounds such as stannous octoate.

An approximately four fold excess of the diol (IV) over the isocyante (V) is employed in order to avoid formation of a bis-carbamate. The progress of the reaction can be followed by routine procedures, for example, using infrared spectroscopy and the like. The desired stilbene (I) can be isolated from the reaction mixture by routine procedures. For example, the inert organic solvent can be removed by distillation and the residual solid product (I) can be purified, if desired, by recrystallization and the like.

The diols (IV) are well known in the art. Illustrative of such diols are ethylene glycol, 1,2-propylene glycol, 1,4-butanediol, 2,3 - pentanediol, 1,2 - octanediol, 1,6-hexanediol and the like. The isocyanates (III) and methods for their preparation are described in U.S. Pat. 3,555,071.

The novel radiation-sensitive polymers of the invention of the type (a) above, namely those characterized by a recurring unit of the Formula II, are prepared conveniently from the appropriate copolymer of maleic anhydride with styrene or a lower-alkyl vinyl ether. The latter copolymers are well known in the art and are characterized by a recurring unit having the following structure:

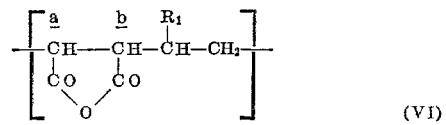

wherein $R_1$ is as defined above.

In preparing the radiation-sensitive polymers of the invention having the recurring unit (II), the copolymer having the Formula VI above is reacted with the stilbene (I). The reaction is carried out in the presence of a tertiary base and, advantageously, in the presence of an inert organic solvent. Examples of tertiary bases which can be used, and which are generally present in the reaction mixture in an amount corresponding to at least 10 percent by weight of copolymer (VI), are pyridine, N,N-dimethylaniline, triethylamine, N - methylmorpholine, N-methylpiperidine and the like. Pyridine is the preferred tertiary base and can, if desired, be used in sufficient amounts to act as solvent as well as catalyst for the reaction. Indeed, in a most preferred embodiment, the reaction is carried out with both reactants in solution in pyridine.

However, in place of the excess of pyridine as solvent, there can be used an inert organic solvent, i.e. an organic solvent which does not enter into reaction with either reactants or interfere in any way with the desired course of the reaction. Examples of inert organic solvents are acetonitrile, acetone, cyclohexanone, tetrahydrofuran, dioxane and the like.

The reaction is advantageously carried out at elevated temperatures, i.e. from about 50° C. to about 150° C. in order to achieve a suitable rate of reaction. The course of the reaction can be followed by routine procedures, for example, by infrared spectroscopic examination of aliquots.

The relative molar proportions in which the reactants, namely the copolymer of recurring unit (VI) and the stilbene (I), are employed determines the nature of the product. Thus, by using one molar proportion of stilbene (I) for each anhydride moiety (VI) present in the starting copolymer, there is obtained a product in which each of the original recurring units (VI) in the starting copolymer has been converted to a unit of the Formula II. By using less than 1 molar proportion of stilbene (I) for each anhydride moiety (VI) present in the starting copolymer, there is obtained a product in which some, but not all, of the original recurring units (VI) present in the starting copolymer have been converted to units of the Formula II. The remainder of the recurring units in the resulting polymer are moieties of Formula VI. The proportion of recurring units of Formula II to original recurring units of Formula VI in the product will be directly proportional to the molar proportion of stilbene (I) employed in the above reaction.

Further, by reacting the initial copolymer having recurring units (VI) with less than 1 molar proportion of stilbene (I) per anhydride group in said copolymer, and then reacting the product so obtained with a second, but different, stilbene of Formula I, there can be obtained a polymer in which there are different $R_2$ and/or $R_3$ groups in the recurring units (II). Similarly, by employing a plurality of stilbenes of Formula I in a reaction sequence of the above nature, there can be obtained a polymer in which a plurality of different $R_2$ and/or $R_3$ groups are present in the units (II).

When the reaction of the copolymer of recurring unit (VI) and the stilbene (or plurality of stilbenes) of Formula I is adjudged complete, the polymer of recurring unit (II) is isolated from the reaction product by procedures conventional in the art. For example, the inert organic solvent can be removed by distillation or, alternatively, a solvent in which the desired product is insoluble can be added to the reaction mixture. The desired product is then either left as a residue of the distillation or is precipitated from solution and isolated by filtration, decantation or like means. Purification can be effected by routine procedures such as solvent extraction, reprecipitation, chromatography and the like.

The reaction of the stilbene (I) with the polymer of recurring unit (VI) results in opening of the anhydride ring in a proportion of, or in the whole of, the units of Formula VI. The ring opening gives rise to one free carboxyl group and one esterified carboxyl group on adjacent carbon atoms designated $a$ and $b$ in Formula VI. It will be apparent to one skilled in the art that two possible structures can exist. In one structure the free carboxyl group is attached to the carbon atom designated $a$ and the esterified carboxy group is attached to the carbon atom designated $b$. In the other possible structure the positions of the free carboxyl group and the esterified carboxyl group are reversed. It will be further apparent to one skilled in the art that the radiation-sensitive polymer of the invention which is obtained by the above reaction will contain some recurring units having the one structure and other recurring units having the other structure. It is therefore, to be understood that the general Formula II shown above as the recurring unit characterizing the polymers of the invention of type (a) is intended to embrace and represent all the possible structures within the polymer chain discussed above.

In addition, as noted previously, the stilbene moieties in the polymers of the invention having the recurring unit (II) can be present in cis or trans form or in one form present in some recurring units in the polymer chain and in the other form in other recurring units in the polymer chain.

The radiation-sensitive polymers of the invention of type (b) having the recurring unit (III) above can be prepared in analogous fashion to the polymers of type (a). Illustratively, the polymers having the recurring unit (III) can be prepared from those polymers having the recurring unit (II) which still contain intact anhydride moieties of Formula VI. The latter are reacted, under the same conditions described above for the reaction of stilbene (I) with the copolymers of recurring unit (VI), with the appropriate alcohol having the formula:

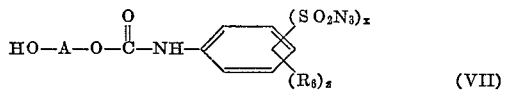

(VII)

wherein A, $x$, $R_6$, and $z$ are as above defined.

Alternatively, the radiation-sensitive polymers of the invention having the recurring unit (III) are prepared by reacting, under the same conditions described above, the copolymer of recurring unit (VI) with an alcohol of Formula VII, the said alcohol being used in a proportion insufficient to react with all the anhydride moieties in the starting copolymer. The product so obtained is then reacted, under the same conditions, with the appropriate proportion of stilbene (I) necessary to react with some, or all the remaining anhydride moieties.

In a third, alternative, method of preparing the radiation-sensitive polymers of the invention having the recurring unit (III), the starting copolymer having the recurring unit (VI) is reacted simultaneously with the stilbene (I) and the alcohol (VII) using the same conditions as are described above for reactions of the stilbene (I) alone with the starting copolymer. The residue of the stilbene (I) and the alcohol (VII) will become attached in random fashion to the polymer chain when this method is employed.

Whichever of the three methods is adopted to prepare the polymers of recurring unit (III), the relative proportion of residues of the stilbene (I) and the alcohol (VII) in the resulting polymer can be controlled by using the appropriate proportions of these reactants.

Just as in the case of the polymers of recurring unit (II) so in the case of the polymers of recurring unit (III), the ring opening of the anhydride moiety of Formula VI can give rise to one free carboxyl group and one esterified carboxyl group on adjacent carbon atoms designated $a$ and $b$ in Formula VI, and two possible structures can exist in any of the recurring units of the polymer (III). This is in addition to the possibility that the stilbene residue can be present in either cis or trans form wherever it is present.

By virtue of the free carboxyl group in the recurring unit (II) and (III) of the polymers of the invention, said polymers can be converted to the corresponding carboxylic acid salts by reaction with the appropriate base. As will be obvious to one skilled in the art, it is possible to convert only one, or several, or all of the plurality of free carboxyl groups in the chain of the polymer of the invention to the corresponding salts. In general, the greater the number of carboxyl units which are converted to salt form, the greater the water solubility of the resulting polymer. The polymers of the invention in which one or more or all of the free carboxylic groups are converted to salts are included within the scope of the invention.

Illustratively, the polymers of the invention can be converted to their alkali metal, alkaline earth metal, ammonium and organic amine salts. "Alkali metal" is inclusive of sodium, potassium, lithium, rubidium, caesium and the like. "Alkaline earth metal" is inclusive of calcium, barium, strontium, magnesium and the like. "Organic amine" is inclusive of monoalkylamines such as methylamine, ethylamine, isopropylamine, sec-butylamine, amylamine, hexylamine, isohexylamine, octylamine and the like; dialkylamines such as dimethylamine, N-ethyl-N-methylamine, N-methyl-N-propylamine, N-methyl-N-isobutylamine, diisopropylamine, N-ethyl-N-hexylamine, N-methyl-N-isooctylamine and the like; trialkylamines such as triethylamine, trimethylamine, N,N-dimethylpropylamine, N,N-dimethylhexylamine, N,N-diethylisobutylamine and the like; monoalkenylamines such as allylamine, 2-butenylaine, 3-hexenylamine, octenylamine and the like; dialkenylamines such as diallylamine, di-2-butenylamine, di-3-hexenylamine and the like; cycloalkylamines such as cyclopropylamine, cyclobutylamine, cyclopentylamine, cyclohexylamine and the like; N-alkyl-cycloalkylamines such as N-methylcyclopentylamine, N-ethylcyclopentylamine, N-propylcyclohexylamine and the like; cycloalkenylamines such as cyclopentenylamine, cyclohexenylamine and the like; aralkylamines such as benzylamine, phenethylamine, phenylpropylamine, benzhydrylamine and the like; N-alkyl-N-aralkylamines such as N-methylbenzylamine, N - propylbenzylamine, N-isobutylbenzylamine, N - octylbenzylamine, N - methylphenethylamine and the like; N,N-disubstituted aralkylamines such as N,N - dimethylbenzylamine, N - methylbenzhydrylamine, N,N-diethyl-3-phenylpropylamine, N - butyl-2-phenethylamine and the like; N-alkyl-arylamines such as N-methylaniline, N-isopropylaniline, N-hexylaniline, N-methyl-p-toluidine, N-ethyl-m-xylidine, N-methylnaphthylamine, N-methylbenzidine, N,N'-dimethylbenzidine and the like; N,N-dialkylarylamines such as N,N-dimethylaniline, N,N-dibutylaniline, N-hexyl - N - methylaniline, N,N-dimethyltoluidine and the like; N-aralkyl-arylamines such as N-benzylaniline, N-phenethylaniline, N-benzhydrylaniline and the like; arylamines such as aniline, o-, m-, and p-toluidine, o-, m-, and p-xylidine, 1-naphthylamine, 2-naphthylamine and the like; alkanolamines such as ethanolamine, propanolamine, diethanolamine and the like; heterocyclic amines such as pyridine, quinoline, pyrrolidine, piperazine, morpholine, and alkyl-substituted pyrrolidines, piperidines, piperazines and morpholines, such as N-methylpyrrolidine, N-ethylpiperidine, N-methyl-N'-hexylpiperazine, N-methylmorpholine and the like.

The above salts of the polymers of the invention can be prepared readily from the free carboxylic acid polymers of the invention by any of the methods conventionally used in the art for preparing carboxylic acid salts of this type. Illustratively, the free carboxylic acid polymer is dissolved in a water-miscible solvent such as acetone and treated with the appropriate amount of base to neutralize some or all of the free carboxyl groups in the polymer. In the preparation of the alkali metal, alkaline earth metal, or ammonium salts, the base is advantageously in the form of an aqueous solution of the corresponding hydroxide or carbonate or an alcohol solution of the corresponding alkoxide. In the case of the amine salts, the free amine is used as the base, advantageously as a solution in a water-miscible solvent. The resulting salt separates from solution particularly if there is little or no water present in the reaction mixture. Alternatively, the salt can be isolated by partial or complete evaporation of the solution or by addition of an appropriate salt in which the salt is insoluble.

It will be readily appreciated by one skilled in the art that part of the free carboxylic acid groups in the polymers of the invention can be converted to the corresponding salt using a first base, and some or all of the remaining free carboxylic acid groups in the partially neutralized polymer can be reacted with a second base and even with a third or fourth base so as to produce mixed salts of the polymers of the invention.

In general the molecular weight of the radiation-sensitive polymers of the invention will be within the range of about 100,000 to about 2,000,000. Said polymers are for the most part, resinous solids which are soluble, in the form of the free carboxylic acid, in polar solvents such as acetone, methyl ethyl ketone, tetrahydrofuran, dioxane and the like, from which they can be cast as films as will be described in more detail hereinafter. In the form of their salts, either partially or fully neutralized, the polymers of the invention are soluble in water and aqueous liquids and can be cast as films therefrom The maleic anhydride copolymers having the recurring unit (VI) which are employed as starting materials in the process of the invention are well-known in the art; see, for example, Encyclopedia of Chemical Technology, edited by Kirk-Othmer, Interscience, New York, N.Y., 1965, vol. 8, pages 685 et seq. and vol. 11, page 652; U.S. Pats. 2,424,814 and 2,047,398. These copolymers can be obtained in a wide range of molecular weight, namely, from about 100,000 to about 1,250,000. As will be appreciated by one skilled in the art, the chain length of the starting maleic anhydride copolymer will remain unaffected by the conversion to the half ester polymer having recurring unit (II) or (III) although the overall molecular weight of the polymer will increase according to the number of anhydride moieties in the starting copolymer which are converted to half-ester moieties.

The alcohols (VIII), which are employed as starting materials in preparing the polymers of the invention, are readily prepared by reacting the appropriate diol HO—A—OH, wherein A has the significance hereinbefore defined, with the appropriate isocyanatobenzenesulfonyl chloride of formula:

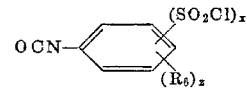

wherein $R_6$, $x$ and $z$ have the significance hereinbefore defined. There is thus obtained the corresponding sulfonylchloride intermediate having the formula:

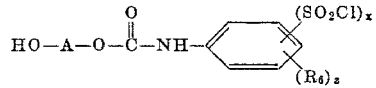

which intermediate is then reacted with sodium azide to convert the sulfonylchloride moiety to sulfonylazide and yield the desired alcohol (VII).

In carrying out the above synthesis of the starting alcohol (VII), the diol HO—A—OH and the isocyanatobenzene sulfonylchloride are brought together under conditions well known in the art for the reaction of alcohols and isocyanates. Advantageously, the reactants are brought together at ambient temperatures, i.e. of the order of 20° C. to 25° C., in the presence of an inert organic solvent as hereinbefore defined. The reaction mixture is maintained below about 50° C., after the reactants have been brought together, in order to avoid reaction of the hydroxy groups in the diol with the sulfonyl halide moieties in the isocyanatosulfonyl chloride. Such reaction would clearly give rise to undesired by-products.

If desired, the reaction between the diol and the isocyanatobenzene sulfonylchloride can be carried out in the presence of a catalyst. Illustrative of such catalysts are those conventionally used in promoting the reaction between a hydroxyl group and an isocyanato group, such as, for example, triethylamine, triethylenediamine, N,N,N',N'-tetramethylethylenediamine, N,N,N',N'-tetraethylethylenediamine, N - methylmorpholine, N - ethylmorpholine, 1,1,3,3 - tetramethylguanidine, N,N,N',N'-tetramethyl - 1,3 - butanediamine, stannous octoate, dibutyltin dilaurate and the like.

The intermediate hydroxyalkyl carbamate so prepared can, if desired, be isolated from the reaction mixture, for example, by evaporation of solvent, and purified, for example by recrystallization, before conversion to the desired alcohol (VII). However, it is generally not necessary to isolate the compound prior to its conversion to the desired alcohol (VII) and, indeed, in most instances the reaction product obtained in the reaction of the diol and the isocyanatosulfonyl chloride can be employed without any further treatment in the conversion to the alcohol (VII). Illustratively, the reaction product obtained in the above process, comprising the hydroxyalkyl carbamate in solution in inert organic solvent, is treated, without any purification, with the appropriate amount of sodium azide, i.e. one mole of sodium azide for each $SO_2Cl$ group in the carbamate. The reaction is exothermic and is controlled, by cooling as required, to maintain the reaction temperature in the range of about 25° C. to about 80° C. Sodium chloride is eliminated in the reaction and precipitated from the reaction mixture thereby serving as a ready guide to the progress of the reaction. The desired alcohol (VII) can be separated from the reaction mixture by conventional procedures. For example, the sodium chloride, which has precipitated, is separated by filtration and the filtrate is evaporated to dryness. If a water miscible solvent is being used, the reaction mixture can be poured into excess water to precipitate the alcohol. The alcohol (VII) so isolated can be purified by recrystallization or like procedures prior to being employed in the synthesis of the polymers of the invention.

The isocyanatobenzene sulfonylchlorides which are employed as starting materials in the preparation of the alcohols (VII) are, for the most part, well known in the art and are obtained by phosgenation of the corresponding known aminobenzenesulfonic acids using conventional procedures such as those described by Alberino et al., J. Polymer Science, vol. 5, pp. 3212–13, 1967.

The polymers of the invention having the recurring unit (II), in addition to being useful as intermediates in the preparation of polymers of recurring unit (III), are sensitizers useful in conjunction with photosensitive materials which are activated by irradiation with ultraviolet radiation. Illustrative of the latter types of material are those described in U.S. 3,455,689; 3,462,268; and 3,453,108 and in copending application Ser. No. 93,446, supra. The sensitizing polymers of the invention having the recurring unit (II) are particularly useful in that, in the form of their salts as hereinbefore described, they are water soluble in contra-distinction to many of the sensitizers commonly used.

The polymers of the invention having the recurring unit (III) are radiation-sensitive polymers with a built-in sensitizer and, accordingly, are useful in a variety of ways. For example, said polymers can be used as a means of chemically bonding basic dyestuffs to the surface of a variety of substrates such as paper, cotton, and like cellulosic materials, metal, glass and the like as well as substrates which contain a plurality of —C—H bonds, such as polyolefins, polyurethanes, polyamides, polyesters, polyacetals and the like, which are not normally receptive to such dyestuffs. In this particular use of the polymers (III) of the invention, a coating of the latter is applied to a part, or the whole, of the surface of the substrate to be treated. The coating is applied advantageously by dissolving the radiation-sensitive polymer of the invention in a polar solvent, such as exemplified above, and spreading the solution on the substrate using the appropriate spreading means.

If desired, the radiation-sensitive polymer of the invention can be employed in the form of a salt, as hereinbefore defined, in which case the polymer coating can be applied by using an aqueous solution of the salt. Advantageously, the polymer is employed as a partially neutralized salt, i.e. only a portion of the free carboxylic acid groups have been converted to the salt leaving free carboxylic groups in the polymer chain available for coupling with dyestuff in the latter stages of the process.

The coated substrate is then exposed to an appropriate source of radiation, either thermal or actinic, necessary to activate the polymer of the invention. A wide variety of sources of thermal and/or actinic radiation can be employed. Such sources include carbon arcs, mercury vapor lamps, fluorescent lamps, argon glow lamps, photographic flood lamps, and tungsten lamps. Preferably, the source of radiation is one which generates ultraviolet light of wavelength within the range of about 250 nm. to about 390 nm.

If desired, the irradiation of the coated substrate can be performed "imagewise"; that is to say, a negative of an image to be produced on the surface of the substrate is interposed between the coated substrate and the source of radiation. The radiation-sensitive polymer in those portions of the coated substrate receiving the radiation is activated and becomes chemically bonded to the surface of the substrate. The chemical bonding of the radiation-sensitive polymer to the substrate is believed to take place by degradation of the sulfonazido group or groups in the moieties (I) to yield a nitrene radical which enters into interaction with —C—H bonds in the substrate. This suggested reaction mechanism is, however, offered by way of explanation only and is not intended in any way to define or limit the scope of the present invention.

When the coating of the polymer of the invention has been bonded to the substrate in the above manner, the surface of the substrate, or in the case of imagewise irradiation, that portion of it bearing the irradiated image, has directly bonded to it a series of free carboxyl groups in the recurring units (III). The resulting image can be developed by removal of unchanged polymer from un-irradiated areas and treatment of the irradiated surface with a basic dye thereby achieving chemical bonding of the basic dyestuff to the surface of the substrate via said free carboxyl groups.

The removal of the unchanged polymer from the non-irradiated areas can be accomplished, in the case where the initial polymer was employed in the free carboxylic acid form, by washing with a polar solvent, advantageously the same solvent as was used in coating the substrate originally. Alternatively, and preferably, the unchanged polymer in the free carboxylic acid form is removed by washing with an aqueous solution of a base such as alkali metal hydroxide, alkali metal carbonate, ammonium hydroxide, alkaline earth metal carbonate and the like. The unchanged polymer is removed as an aqueous solution of its salt and, if desired, the free carboxylic acid form can be recovered therefrom for re-use by acidification of the solution.

Where the polymer was applied to the substrate in the form of a water-soluble salt, the removal of unchanged polymer after imagewise irradiation is effected readily by washing with water. The polymer can be recovered as such or in the free carboxylic acid form from the aqueous washings by acidification and isolation of the resulting precipitate.

The application of the dyestuff to the treated substrate, after development if required, can be accomplished in any conventional manner, as by dipping in a bath of dyestuff, or application of dye by roller, sponge and the like.

The term "basic dyestuff" is one well recognized in the art as characterizing a particular class of dyestuffs, namely, those which will react with an acid (mineral acid or organic carboxylic acid) to form a corresponding salt. A comprehensive list of basic dyestuffs and a description of their properties is set forth in Colour Index, second edition, vol. 1, pages 1617–1653, 1956, published jointly by The Society of Dyers and Colourists, Bradford, Yorkshire, England, and The American Association of Textile Chemists and Colorists, Lowell, Mass. Any of the basic dyestuffs set forth in said Colour Index can be employed in the process and compositions of the invention. Generally, said basic dyestuffs are employed in the form of aqueous solutions.

Typical of said basic dyestuffs are: crystal violet, methylene blue, malachite green, auramine O, basic fuchsin, Aniline Yellow, Disperse Orange 3, Disperse Black 7, Disperse Red 13, Disperse Red 9, Vat Red 33, Mordant Violet 6, Phenylene Blue, Disperse Orange 11, Natural Orange 6, Natural Brown 7, and Natural Yellow 12.

As will be readily appreciated by one skilled in the art, the above process, for chemically bonding basic dyestuffs to polymeric substrates not normally receptive to such dyes, can be adapted to a variety of dyeing and/or printing techniques. For example, the printing of advertising and like matter on polymer films can be accomplished readily on a continuous basis by passing a continuous sheet of said film successively through zones in which the film is coated with a radiation-sensitive polymer of the invention, coated film is exposed imagewise to activating radiation from an appropriate source, the unexposed coating is removed using any of the procedures above, and finally, the film with image bonded in place is contacted with basic dye.

In an alternative, but less preferred, method of employing the novel polymers of the invention to chemically bond dyes to substrates, the novel polymer of the invention is treated with the dyestuff in a preliminary step and the radiation-sensitive polymer, with dye incorporated therein, is applied as a coating to the surface of the substrate to be treated. The coated substrate is then exposed to appropriate radiation to effect bonding of the radiation-sensitive polymer (with dye already attached) to the substrate. The exposure to radiation can be done imagewise, if desired, and the unexposed radiation-sensitive polymer+dye can be eluted from the exposed surface leaving the required image bonded to the substrate.

In another, related, use of the novel radiation-sensitive polymers of the invention having the recurring unit (III), the latter are applied in the form of a coating to a substrate and bonded thereto by irradiation as described above. The surface of the substrate is thereby rendered hydrophilic by virtue of the carboxylic moieties present in the polymer. If desired, the carboxylic acid moieties can be converted to the corresponding alkali metal or alkaline earth metal, or ammonium salt phase to increase or modify the hydrophilic properties. The above procedure represents a very convenient method of rendering hydrophilic the surfaces of substrates such as polyolefins and the like which are normally hydrophobic.

In yet another use of the novel radiation-sensitive polymers of the invention having the recurring unit (III), the latter is employed as the components of a photoresist system. For example, the said polymers can be used in the photographic reproduction and printing arts to produce printed masters as follows. The polymer (III) is dissolved in a polar organic solvent such as those exemplified above or, in the case of a salt of polymer (III), the salt is dissolved in aqueous or polar solvent solution, and cast as a film on an appropriate substrate such as paper, metal and like film supports normally employed in the reproduction art. A negative of the image to be reproduced, e.g. lined, screened or half-tone negatives, or diapositives, is interposed between the supported film so obtained and a source capable of producing radiation necessary to activate the radiation-sensitive polymer. The polymer in those portions of the supported film exposed to the radiation is thereby bonded to the substrate. The polymer in the unexposed portions of the film can then be removed, using any of the techniques described above, leaving the exposed polymer bonded to the substrate in the form of a positive image corresponding to the negative used in the irradiation step. Said image has high resistance to solvents and mechanical stresses and can be used to advantage as a master from which to reproduce copies of the original.

In a similar manner photoresist systems produced from the radiation-sensitive polymers of the invention can be used in other photoresist applications such as in the printing of microcircuitry and related applications which involve production of an image, in the form of bonded polymer, on a metal substrate such as copper, followed by removal, in part or in toto, of the uncoated metal by etching. Essentially the same technique as that described above in the production of printed masters is employed in the formation of the polymer image on the substrates.

The water soluble salts of the radiation-sensitive polymers of the invention are additionally useful in that they can be used as electrolytes in the electrodeposition of polymer coatings on metals and the like in accordance with procedures well known in the art.

The following preparations and examples describe the manner and process of making and using the invention and set forth the best mode contemplated by the inventors of carrying out the invention but are not to be construed as limiting.

PREPARATION 1

To 50.4 gms. (0.8 mole) of ethylene glycol in 500 ml. of acetonitrile is added a solution of 43.2 gms. (0.2 mole) of 4-isocyanatobenzene sulfonylchloride (prepared by the method of L. Alberino et al., supra). The addition is accomplished over a period of 10 minutes with stirring and cooling at circa 2° C. to 8° C., and the mixture is then allowed to stand at room temperature until the NCO band stretching has disappeared in the infrared spectrum of an aliquot of the reaction mixture (approximately 30 minutes). To the mixture so obtained is added 13 gms. (0.2 mole) sodium azide and the resulting mixture is stirred for one hour at room temperature. The sodium chloride which has precipitated is removed by filtration and about 80 percent of solution is evaporated from the filtrate under vacuum. Water is added to the remaining filtrate to precipitate the water insoluble product. The latter is separated by filtration, washed with water, and dried under vacuum at room temperature. There is thus obtained 52 gms. (91 percent theoretical yield) of a white crystalline powder identified by infrared and NMR spectrometric examination as 2-hydroxyethyl 4-azidosulfonylcarbanilate and having a melting point of 115° C. to 118° C. Recrystallization from acetonitrile gave white crystals having a melting point of 120° C. to 122° C. (Fisher-Johns method); 124° C. (DSC method).

*Analysis.*—Calcd. for $C_9H_{10}N_4O_5S$ (percent): C, 37.76; H, 3.46. Found (percent): C, 37.60; H, 3.73.

Using the above procedure but replacing ethylene glycol by 1,3-propylene glycol, 1,4-butanediol, 1,3-pentanediol, 2,3-hexanediol, 1,5-heptanediol, and 2,2-dimethyl-1,6 - hexanediol, 2,5 - diethyl - 1,6-hexanediol there are obtained:

3-hydroxypropyl,
4-hydroxybutyl,
3-hydroxypentyl,
3-hydroxy-2-methylpentyl,
5-hydroxyheptyl,
6-hydroxy-2,2-dimethylhexyl, and
6-hydroxy-2,5-diethylhexyl 4-azidosulfonylcarbanilate, respectively.

PREPARATION 2

A mixture of 0.56 g. (0.002 mole) of 2-hydroxyethyl 4-azidosulfonylcarbanilate and 1.56 g. of a poly(maleic anhydride co-methylvinyl ether) (having an average molecular weight of 250,000: Gantrez AN 119) was dissolved in 25 ml. of anhydrous pyridine and the mixture was heated at 100° C. for 3 hours. The resulting mixture was evaporated to dryness and the residue was dissolved in 25 ml. of a mixture of equal parts of acetone and methanol. The solution was poured into an equal volume of aqueous 2 N hydrochloric acid. A brown mass was precipitated and the supernatant liquid was decanted therefrom. The brown mass was again dissolved in about 25 ml. of a mixture of acetone and methanol. The polymer was reprecipitated from said solution by addition of 50 ml. of carbon tetrachloride. The brown precipitate was isolated by decantation and dried. There was thus obtained a photosensitive modified copolymer of maleic anhydride and methylvinyl ether in which 1 in 5 of the recurring units in the chain was a moiety represented by the formula:

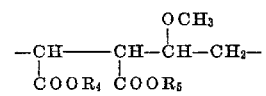

wherein one of $R_4$ and $R_5$ is hydrogen and the other is

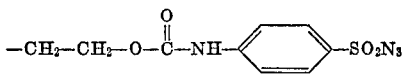

Similarly, using the procedure described above but replacing the 2-hydroxyethyl 4-azidosulfonylcarbanilate by any of the carbanilates named at the end of Preparation 1, there are obtained the corresponding modified copolymers.

EXAMPLE 1

2-hydroxyethyl trans-2,5-dimethoxy-stilbene-4'-carbamate

A solution of 22.4 g. (0.08 mole) of trans-2,5-dimethoxy-4'-isocyanatostilbene (U.S. Pat. 3,555,071) in 100 ml. of acetonitrile was added dropwise to a refluxing solution of 19.9 g. (0.32 mole) of ethylene glycol in 200 ml. of acetonitrile over a period of 60 minutes. The resulting mixture was heated under reflux for 3 hours. At the end of this time part of the acetonitrile was removed by distillation under reduced pressure until about 90 ml. of residue remained. This residue was added to 300 ml. of water. The solid which separated was isolated by filtration, washed with water and dried. There was thus obtained 25.5 g. (94 percent theoretical yield) of 2-hydroxyethyl trans - 2,5 - dimethoxystilbene-4'-carbamate which, after recrystallization from benzene, had a melting point of 99 to 104° C.

Analysis.—Calcd. for $C_{19}H_{21}NO_5$ (percent): C, 66.46; H, 6.16; N, 4.08. Found (percent): C, 66.64; H, 6.18; N, 4.28.

Similarly, using the above procedure but replacing ethylene glycol by 1,3-propylene glycol, 1,4-butanediol, 1,3-pentanediol, 2,3-hexanediol, 1,5-heptanediol, 2,2-dimethyl-1,6-hexanediol or 2,5-diethyl-1,6-hexanediol, there are obtained:

3-hydroxypropyl,
4-hydroxybutyl,
3-hydroxypentyl,
3-hydroxy-2-methylpentyl,
5-hydroxyheptyl,
6-hydroxy-2,2-dimethylhexyl, and
6-hydroxy-2,5-diethylhexyl trans-2,5-dimethoxystilbene-4'-carbamate, respectively.

Similarly, the corresponding cis-isomers of any of the above-named compounds are obtained by replacing the trans-2,5 - dimethoxy - 4' - isocyanatostilbene starting material by the corresponding cis-isomer.

EXAMPLE 2

Using the procedure described in Example 1, but replacing trans - 2,5 - dimethoxy-4'-isocyanatostilbene by the corresponding cis-isomer (U.S. Pat. 3,555,071) there is obtained 2-hydroxyethyl cis-2,5-dimethoxystilbene-4'-carbamate.

Similarly, using the procedure described in Example 1, but replacing trans-2,5-dimethoxy-4'-isocyanatostilbene by either the cis- or trans-isomers of 4-butoxy-4'-isocyanatostilbene,
2-butoxy-3-ethoxy-4'-isocyanatostilbene,
2,3-diethoxy-4'-isocyanatostilbene,
3,4-diisopropoxy-4'-isocyanatostilbene,
3,4-dimethoxy-4'-isocyanatostilbene,
4-ethoxy-2,6-dimethoxy-4'-isocyanatostilbene,
3-ethoxy-2-hexyloxy-4'-isocyanatostilbene,
3-ethoxy-2-pentyloxy-4'-isocyanatostilbene,
2-isobutoxy-3-methoxy-4'-isocyanatostilbene or
2,4,6-trimethoxy-4'-isocyanatostilbene, (all of which are described in U.S. 3,555,071) there are obtained the corresponding cis- and trans-isomers of 2-hydroxyethyl 4-butoxystilbene-4'-carbamate,
2-hydroxyethyl 2-butoxy-3-ethoxystilbene-4'-carbamate,
2-hydroxyethyl 2,3-diethoxystilbene-4'-carbamate,
2-hydroxyethyl 3,4-diisopropoxystilbene-4'-carbamate,
2-hydroxyethyl 3,4-dimethoxystilbene-4'-carbamate,
2-hydroxyethyl 4-ethoxy-2,6-dimethoxystilbene-4'-carbamate,
2-hydroxyethyl 3-ethoxy-2-hexyloxystilbene-4'-carbamate,
2-hydroxyethyl 3-ethoxy-2-pentyloxystilbene-4'-carbamate,
2-hydroxyethyl 2-isobutoxy-3-methoxystilbene-4'-carbamate,
2-hydroxyethyl 2,4,6-trimethoxystilbene-4'-carbamate, respectively.

EXAMPLE 3

A total of 31.2 g. (0.2 mole) of a poly(maleic anhydride co-methylvinyl ether) (having an average molecular weight of 250,000: Gantrez AN 119) was added to a solution of 16.9 g. (0.06 mole) of 2-hydroxyethyl 4-azidosulfonylcarbanilate and 19.7 g. (0.06 mole) of 2-hydroxyethyl trans-2,5-dimethoxystilbene-4' - carbamate in 1100 ml. of acetonitrile. To the resulting mixture was added slowly, over a period of 4 hours, a total of 10.1 g. (0.1 mole) of triethylamine. At the end of this time the mixture was allowed to remain overnight at room temperature (circa 25° C.), with stirring. Approximately one-half of the acetonitrile was then removed by distillation under reduced pressure and the residue was neutralized by the addition of 10.5 ml. of concentrated hydrochloric acid. The neutralized residue was added to 3 liters of ice-cold water and the solid which separated was isolated by filtration, washed with water, and dried. There was thus obtained 65.6 g. (94 percent theoretical yield) of a yellow, powdery, photosensitive modified compolymer of maleic anhydride and methylvinyl ether in which 3 in 10 of the recurring units in the chain were moieties represented by the formula:

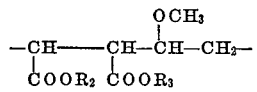

wherein one of $R_2$ and $R_3$ is hydrogen and the other is:

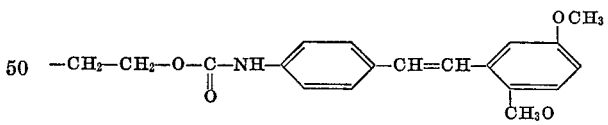

and in which 3 in 10 of the recurring units in the chain were moieties represented by the formula:

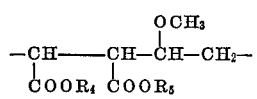

wherein one of $R_4$ and $R_5$ is hydrogen and the other is:

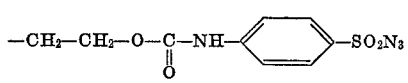

EXAMPLE 4

A total of 31.2 g. (0.2 mole) of a poly(maleic anhydride co-methylvinyl ether) (having an average molecular weight of 250,000; Gantrex AN 119) was added to a solution of 28 g. (0.1 mole) of 2-hyroxyethyl 4-azidosulfonylcarbanilate and 6.6 g. of (0.02 mole) of 2-hydroxyethyl trans-2,5-dimethoxystilbene-4' - carbamate in 500 ml. of acetonitrile. To the resulting solution was added slowly, over a period of 4 hours, 10.1 g. (0.1 mole) of triethylamine. At the end of this time the mixture was allowed to remain at room temperature (circa 25° C.)

with stirring. Approximately one-half of the acetonitrile was then removed by distillation under reduced pressure and the residue was poured into ice-water. The yellow granular polymer which separated was washed with water and dried. There was thus obtained 61 g. (93.5 percent theoretical yield) of a photosensitized modified copolymer of maleic anhydride and methylvinyl ether in which 1 in 10 of the recurring units in the chain were moieties represented by the formulas:

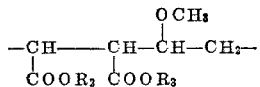

wherein one of $R_2$ and $R_3$ is hydrogen and the other is:

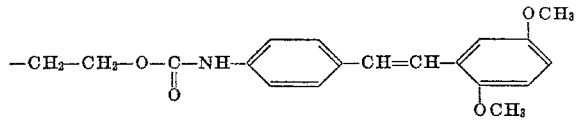

and in which 1 in 2 of the recurring units in the chain were moieties represented by the formula:

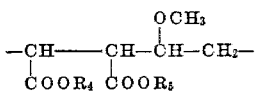

wherein one of $R_4$ and $R_5$ is hydrogen and the other is:

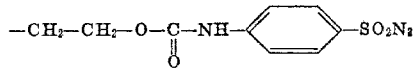

EXAMPLE 5

To a solution of 13.7 g. (0.04 mole) of 2-hydroxyethyl trans-2,5-dimethoxystilbene-4'-carbamate in 250 ml. of dry acetonitrile was added 12.5 g. (0.08 mole) of poly(maleic anhydride co-methylvinyl ether) (Gantrez AN 119). A total of 4 g. of triethylamine was slowly added to the mixture with stirring. The resulting solution was allowed to remain at room temperature (circa 25° C.) overnight with stirring. At the end of this time the solution was evaporated to approximately half of its volume and treated with 3.5 ml. of concentrated hydrochloric acid. The acidified solution was poured into ice-cold water and the solid which separated was isolated by filtration, washed with water, and dried. There was thus obtained a modified copolymer of maleic anhydride and methylvinyl ether in which approximately 1 in 2 of the recurring units in the chain were moieties of the formula:

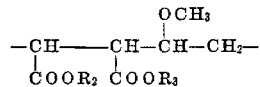

in which one of $R_2$ and $R_3$ is hydrogen and the other is:

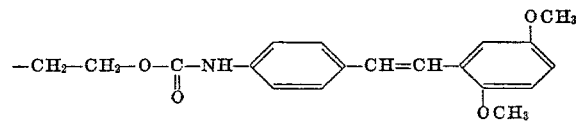

EXAMPLE 6

A mixture of 1.1 g. of the modified co-polymer prepared as described in Example 5 and 6.0 g. of the modified copolymer prepared as described in Preparation 2 was dissolved in a solution of 1.1 g. of triethylamine in 50 ml. of water. To the resulting solution was added 50 ml. of acetone and a thin film (circa 0.3 micron thick) of the solution so obtained was coated on a Mylar sheet. The coated film was then exposed, via a negative, to ultraviolet light generated by a 200 w. mercury lamp. The exposure time was 30 seconds and the light intensity was 2 mw./cm.² The exposed layer was developed under water for 15 seconds and the developed image was made visible by immersion for 10 seconds in an aqueous solution of methylene blue maintained at 70° C. The resulting image was very sharp and clear with fine resolution.

When the above procedure was repeated in the absence of the sensitizer of Example 4, it was found that an exposure time to the ultraviolet radiation of 240 seconds was necessary to obtain a comparably good image. This finding illustrates the useful sensitizing properties of the polymers of the invention.

EXAMPLE 7

A solution of 5 g. of the modified copolymer prepared as described in Example 3 in 50 ml. of water containing 1 g. of triethylamine was diluted with 50 ml. of acetone and used to produce a coating (approximately 0.3 microns thick) on a Mylar sheet. The coated film was then exposed, via a metallic screen negative, to ultraviolet light generated by a 200 w. mercury lamp. The exposure time was 5 seconds and the light intensity was 1 mw./cm.². The exposed layer was developed under water for 15 seconds, and the developed image was made visible by immersion for 10 seconds in an aqueous solution of methylene blue maintained at 70° C. The resulting image was very sharp and clear with fine resolution.

EXAMPLE 8

Using the procedure described in Example 3, but replacing the poly(maleic anhydride co-methylvinyl ether) there employed by a poly(maleic anhydride co-styrene) having an average molecular weight of 100,000, there was obtained the corresponding modified poly(maleic anhydride co-styrene) in which approximately 3 in 10 of the recurring units in the chain were moieties represented by the formula:

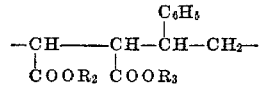

wherein one of $R_2$ and $R_3$ is hydrogen and the other is:

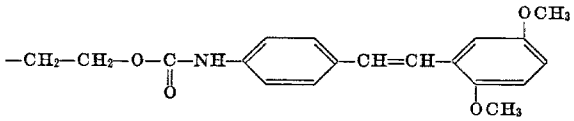

and in which approximately 3 in 10 of the recurring units in the chain were moieties represented by the formula:

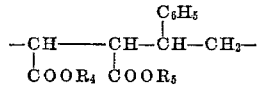

wherein one of $R_4$ and $R_5$ is hydrogen and the other is:

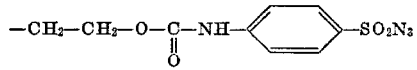

Similarly, using the procedure described in Example 3 but replacing the poly(maleic anhydride co-methylvinyl ether) there employed by a poly(maleic anhydride co-butylvinyl ether) or a poly(maleic anhydride co-hexylvinyl ether), there were obtained the correspondingly modified photosensitive polymers of the invention with a built-in sensitizer.

EXAMPLE 9

Using the procedure described in Example 5, but replacing the poly(maleic anhydride co-methylvinyl ether) there employed by a poly(maleic anhydride co-styrene) having an average molecular weight of 100,000, there was obtained the corresponding modified poly(maleic anhydride co-styrene) in which approximately 1 in 2 of the recurring units in the chain were moieties of the formula:

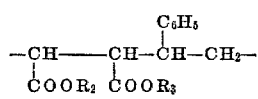

17 in which one of $R_2$ and $R_3$ is hydrogen and the other is:

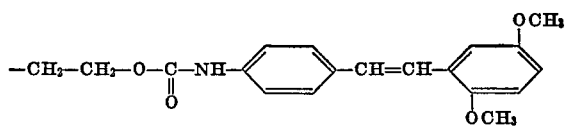

Similarly, using the procedure described in Example 5, but replacing the poly(maleic anhydride co-methylvinyl ether) there employed by a poly(maleic anhydride co-butylvinyl ether) or a poly(maleic anhydride co-hexylvinyl ether), there were obtained the correspondingly modified photosensitive polymers of the invention.

EXAMPLE 10

Using the procedure described in Example 5, but replacing the 2-hydroxyethyl trans-2,5-dimethoxystilbene carbamate there used by the corresponding cis-isomer or by the cis- or trans-isomers of 3-hydroxypropyl,
4-hydroxybutyl,
3-hydroxypentyl,
3-hydroxy-2-methylpentyl,
5-hydroxyheptyl,
6-hydroxy-2,2-dimethylhexyl, or
6-hydroxy-2,5-diethylhexyl 2,5-dimethoxystilbene-4'-carbamate, there are obtained the corresponding sensitizing polymers of the invention.

Similarly, using the procedure described in Example 5, but replacing the 2-hydroxyethyl trans-2,5-dimethoxystilbene carbamate there used by the cis- or trans-isomers of:

2-hydroxyethyl 4-butoxystilbene-4'-carbamate,
2-hydroxyethyl 2-butoxy-3-ethoxystilbene-4'-carbamate,
2-hydroxyethyl 2,3-diethoxystilbene-4'-carbamate,
2-hydroxyethyl 3,4-diisopropoxystilbene-4'-carbamate,
2-hydroxyethyl 3,4-dimethoxystilbene-4'-carbamate,
2-hylroxyethyl 4-ethoxy-2,6-dimethoxystilbene-4'-carbamate,
2-hydroxyethyl 3-ethoxy-2-hexylstilbene-4'-carbamate,
2-hydroxyethyl 3-ethoxy-2-pentyloxystilbene-4'-carbamate,
2-hydroxyethyl 2-isobutoxy-3-methoxystilbene-4'-carbamate, and
2-hydroxyethyl 2,4,6-trimethoxystilbene-4'-carbamate there are obtained the corresponding sensitizing polymers of the invention.

EXAMPLE 11

Using the procedure described in Example 3, but replacing the 2-hydroxyethyl 4-azidosulfonylcarbanilate there employed by:

3-hydroxypropyl,
4-hydroxybutyl,
3-hydroxypentyl,
3-hydroxy-2-methylpentyl,
5-hydroxyheptyl,
6-hydroxy-2,2-dimethylhexyl, or
6-hydroxy-2,5-diethylhexyl 4-azidosulfonylcarbanilate, there are obtained the corresponding photosensitive polymers of the invention wih built-in sensitizers.

EXAMPLE 12

A solution of 1 g. of the photosensitive modified copolymer, prepared as described in Example 3, in 20 ml. of a mixture of acetone and methanol was treated slowly, with vigorous agitation, with aqueous 2 N sodium hydroxide solution until the resulting mixture remained permanently alkaline to litmus. The resulting mixture was diluted with acetone and the precipitated sodium salt of the photosensitive modified copolymer was isolated by filtration. The above procedure was repeated except that the amount of sodium hydroxide solution was reduced to one-half of that used above. There was thus obtained a photosensitive modified copolymer of the invention in which 1 in 2 of the free carboxylic groups had been converted to the sodium salt.

In similar manner, but replacing the aqueous sodium hydroxide solution with potassium hydroxide, lithium hydroxide, calcium hydroxide, or ammonium hydroxides, there are obtained the corresponding potassium, lithium, calcium, and ammonium salts of the photosensitive modified copolymer of Example 3.

Similarly, using the above procedure, any of the other photosensitive or sensitizing polymers of the invention such as those described in Examples 4, 5, 8, 9, 10, and 11 can be converted to the corresponding alkali metal, alkaline earth metal, or ammonium salt.

EXAMPLE 13

A film was cast on a polyethylene plate using an acetone solution of the photosensitive modified copolymer of Example 3. The resulting plate was covered with a negative of an image to be reproduced and the plate so covered was exposed to the light of a 200 w. super high pressure mercury lamp type USH 205D. Exposure was for 15 seconds with the place of exposure at a distance of 50 cm. from the lamp. After irradiation the image deposited on the substrate was developed by washing with an aqueous 5 percent w./v. solution of sodium bicarbonate. The wash solution was acidified by addition of concentrated hydrochloric acid to reprecipitate the unchanged photosensitive polymer. The developed image on the polyethylene plate was then immersed for one minute in a hot dye bath (circa 80° C.) containing 3 percent Malachite green and 5 percent sodium chloride. The plate was then rinsed with water and the image thereon was found to be clear with high resolution.

The above process was repeated but replacing the aqueous sodium carbonate solution employed in the development stage by one of aqueous triethylamine solution, aqueous ammonium hydroxide solution, and aqueous potassium carbonate solution.

We claim:

1. A polymer selected from the class consisting of:
   (a) polymers characterized by the presence of the recurring unit represented by the formula:

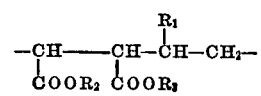

wherein $R_1$ is selected from the class consisting of lower-alkoxy and phenyl, one of $R_2$ and $R_3$ represents hydrogen and the other represents a moiety of the formula:

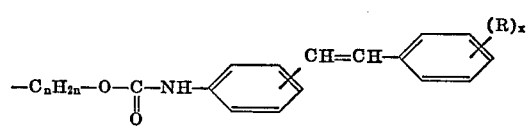

wherein R is lower-alkoxy, $x$ is an integer from 1 to 3 and $C_nH_{2n}$ is alkylene having from 2 to 6 carbon atoms, inclusive, separating the valencies and a total carbon content of from 2 to 10;

(b) polymers characterized by the presence in combination in the same molecule, of each of two recurring units, one of which has the Formula II above wherein $R_1$, $R_2$, and $R_3$ are as defined in (a) above, and the other of which has the formula:

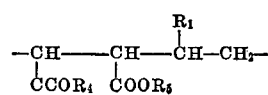

wherein $R_1$ is as defined in (a) above, one of $R_4$ and $R_5$ is hydrogen and the other represents a group of the formula:

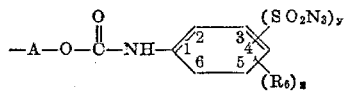

wherein A is alkylene having from 2 to 6 carbon atoms separating the valencies and a total carbon atom content of from 2 to 10, $R_6$ is selected from the class consisting of lower-alkyl and halogen, y is an integer from 1 to 2, z is an integer from 0 to 2, provided that y+z is not greater than 3, and the $SO_2N_3$ group is in any of positions 3, 4, and 5 in the phenyl nucleus to which it is attached, and at least one of the said positions 3, 4, and 5 is unsubstituted; and (c) the salts of the above polymers with a salt-forming moiety selected from the class consisting of alkali metals, alkaline earth metals, ammonia and tertiary amines.

2. A photosensitizing polymer selected from the class consisting of:

(a) polymers characterized by the presence of the recurring unit represented by the formula:

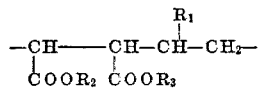

wherein $R_1$ is selected from the class consisting of lower-alkoxy and phenyl, one of $R_2$ and $R_3$ represents hydrogen and the other represents a moiety of the formula:

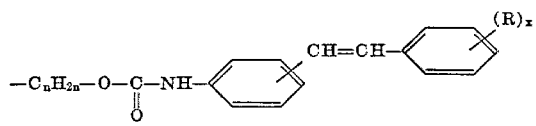

wherein R is lower-alkoxy, x is an integer from 1 to 3 and $C_nH_{2n}$ is alkylene having from 2 to 6 carbon atoms, inclusive, separating the valencies and a total carbon atom content of from 2 to 10, and (b) the salts of the above polymers with a salt-forming moiety selected from the class consisting of alkali metals, alkaline earth metals, ammonia and tertiary amines.

3. A photosensitizing polymer according to claim 2 wherein one of $R_2$ and $R_3$ is hydrogen and the other is a moiety of the formula:

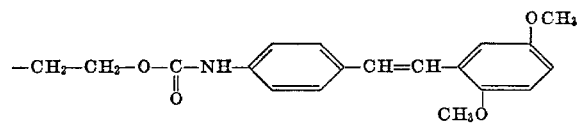

4. A photosensitive polymer selected from the class consisting of:

(a) polymers characterized by the presence, in combination in the same molecule, of each of two recurring units, one of which has the formula:

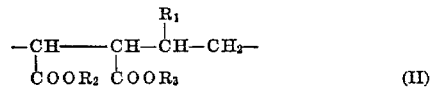

(II)

wherein $R_1$ is selected from the class consisting of lower-alkoxy and phenyl, one of $R_2$ and $R_3$ represents hydrogen and the other represents a moiety of the formula:

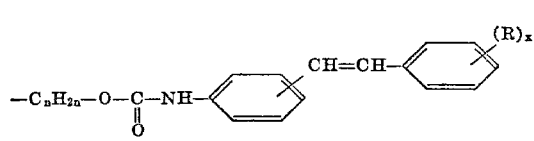

wherein R is lower-alkoxy, x is an integer from 1 to 3 and $C_nH_{2n}$ is alkylene having from 2 to 6 carbon atoms, inclusive, separating the valencies and a total carbon content of from 2 to 10; and the other of said recurring units is represented by the formula:

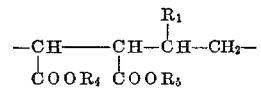

wherein $R_1$ is as defined above, one of $R_4$ and $R_5$ represents hydrogen and the other represents a group of the formula:

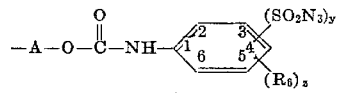

wherein A is alkylene having from 2 to 6 carbon atoms separating the valencies and a total carbon atom content of from 2 to 10, $R_6$ is selected from the class consisting of lower-alkyl and halogen, y is an integer from 1 to 2, z is an integer from 0 to 2, provided that y+z is not greater than 3, and the $SO_2N_3$ group is in any of positions 3, 4, and 5 in the phenyl nucleus to which it is attached, and at least one of the said positions 3, 4, and 5 is unsubstituted; and (b) the salts of the above polymers with a salt-forming moiety selected from the class consisting of alkali metals, alakaline earth metals, ammonia and tertiary amines.

5. A photosensitive polymer according to claim 4 wherein one of $R_2$ and $R_3$ in the recurring unit (II) is hydrogen and the other is a moiety of the formula:

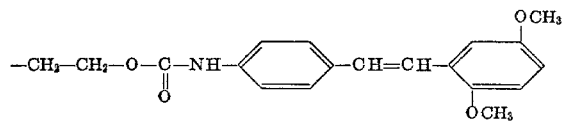

and wherein one of $R_4$ and $R_5$ in the recurring unit (III) is hydrogen and the other is a moiety of the formula:

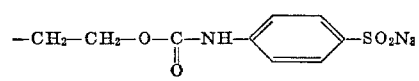

6. A radiation-sensitive composition which comprises (a) a radiation-sensitive polymer characterized by the recurring unit

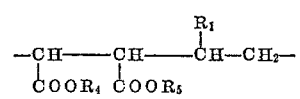

wherein $R_1$ is selected from the class consisting of lower-alkoxy and phenyl, one of $R_4$ and $R_5$ represents a group of the formula:

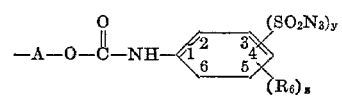

wherein A is alkylene having from 2 to 6 carbon atoms separating the valencies and a total carbon atom content of from 2 to 10, $R_6$ is selected from the class consisting of lower-alkyl and halogen, y is an integer from 1 to 2, z is an integer from 0 to 2, provided that y+z is not greater than 3, and the $SO_2N_3$ group is in any of positions 3, 4 and 5 in the phenyl nucleus to which it is attached, and at least one of the said positions 3, 4 and 5 is unsubstituted, and (b) a sensitizing amount of a polymer as claimed in claim 2.

7. A radiation-sensitive composition which comprises
(a) a radiation-sensitive polymer characterized by the recurring unit:

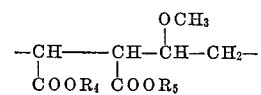

wherein one of $R_4$ and $R_5$ represents hydrogen and the other represents:

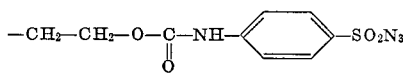

and
(b) a sensitizing amount of a polymer as claimed in claim 3.

References Cited

UNITED STATES PATENTS

| | | | |
|---|---|---|---|
| 3,657,199 | 4/1972 | Sayigh et al. | 260—78.5 T |
| 3,699,080 | 10/1972 | Saygih et al. | 260—47 CZ |
| 3,462,268 | 8/1969 | Danhauser et al. | 96—35.1 |
| 2,948,610 | 8/1960 | Merrill et al. | 96—33 |

JOSEPH L. SCHOFER, Primary Examiner

J. KIGHT III, Assistant Examiner

U.S. Cl. X.R.

96—35.1, 115 R; 117—93.31, 138.8; 204—159.14; 260—47 CZ, 49, 78.5 R, T, 79.3